United States Patent [19]
Browder

[11] 4,091,979
[45] May 30, 1978

[54] METHODS AND APPARATUS FOR PRECISION GUIDING A WEB

[75] Inventor: Lewis B. Browder, Altadena, Calif.

[73] Assignee: Bell & Howell Company, Chicago, Ill.

[21] Appl. No.: 671,534

[22] Filed: Mar. 29, 1976

[51] Int. Cl.² .......................... B65H 17/32
[52] U.S. Cl. ........................... 226/7; 226/21; 226/97; 226/196; 242/76
[58] Field of Search ............ 226/7, 97, 192, 196, 226/17, 15, 198, 21, 99, 189; 242/76

[56] References Cited

U.S. PATENT DOCUMENTS

| | | | |
|---|---|---|---|
| 2,862,715 | 12/1958 | MacDonald | 226/196 UX |
| 3,032,246 | 5/1962 | Fritze | 226/196 X |
| 3,140,033 | 7/1964 | Zivny | 226/196 |
| 3,143,270 | 8/1964 | Cohen | 226/196 |
| 3,243,089 | 3/1966 | Cvacho | 225/189 X |
| 3,268,222 | 8/1966 | Off | 226/196 X |
| 3,608,796 | 9/1971 | Morse | 226/21 |
| 3,658,227 | 4/1972 | Stephens | 226/196 |
| 3,726,588 | 4/1973 | Moser | 226/15 X |
| 3,799,422 | 3/1974 | Matsumoto | 226/196 |

FOREIGN PATENT DOCUMENTS

942,875  10/1946  France .................................. 226/17

*Primary Examiner*—Richard A. Schacher
*Attorney, Agent, or Firm*—Benoit Law Corporation

[57] ABSTRACT

A moving web is precision guided by twisting the moving web about an axis extending in a direction of movement of the web to provide a yaw force acting continuously in a predetermined direction transversely of the web, and resisting that yaw force at a predetermined location.

37 Claims, 4 Drawing Figures

Fig.1

METHODS AND APPARATUS FOR PRECISION GUIDING A WEB

BACKGROUND OF THE INVENTION

1. Field of the Invention

The subject invention relates to methods and apparatus for precision guiding a web and, for instance, has utility in magnetic tape transports, photographic film handling apparatus and other web transporting or handling equipment wherein a precision guiding of a tape, film or other web is required or desired.

2. Description of the Prior Art

Throughout the years, many precision guiding techniques and apparatus have been proposed. By way of example, and not by way of limitation, precision of a web is important in information processing or handling equipment wherein a web-shaped information carrier is to be accurately positioned relative to information recording and playback devices.

One type of prior-art web guiding system may be seen from U.S. Pat. No. 2,989,265, by W. T. Selsted, issued June 20, 1961, U.S. Pat. No. 3,434,639, by C. D. Cowles, issued Mar. 25, 1969, and from an article by Stephen E. Amos, entitled Self-Adjusting Belt Guider, Magazine of Machine Design, November 1953. This type of web guiding system is unsuitable for present purposes because of its inherent facility of adjusting the moving web in either lateral direction.

Another type of web guiding system, exemplified by by U.S. Pat. No. 3,143,270, by N. B. Cohen, issued Aug. 4, 1964, provides a single-edge guide for the moving web, but employs specially shaped guides which impose considerable wear on the tape.

A further type of web guide is apparent from U.S. Pat. No. 3,281,040, by F. F. Grant, issued Oct. 25, 1966. According to that proposal, a positive pressure gradient is established at the guiding element so that the moving web tends to slide "downhill" of the gradient and the edge of the web adjacent a guiding shoulder is brought into contact with that shoulder. Web guides of this type are useful in some applications but tend to be relatively long, bulky and air consumptive.

SUMMARY OF THE INVENTION

It is a general object of this invention to overcome the above mentioned disadvantages.

It is a related object of this invention to provide improved methods and apparatus for precision guiding a web.

It is a germane object of this invention to provide improved magnetic tape transports.

It is also an object of a preferred embodiment of this invention to provide improved methods and apparatus for precision guiding a web without the use of any pressurized air or other medium.

Other objects of the invention will become aparent in the further course of this disclosure.

From one aspect thereof, the subject invention resides in a method of precision guiding a web, comprising in combination the steps of moving the web, providing a guide for the moving web having a web guiding surface, pivoting the guide for movement about a pivot axis extending through the web guiding surface and being laterally spaced from a longitudinal axis of symmetry of the web for twisting the moving web about an axis extending in a direction of movement of the web to provide a yaw force acting continuously in a predetermined direction transversely of the web, and resisting the yaw force at a predetermined location.

From another aspect thereof, the subject invention resides in apparatus for precision guiding a web, comprising, in combination, means for moving the web, guide means for the moving web having a web guiding surface, means operatively associated with the moving means for twisting the moving web about an axis extending in a direction of movement of the web to provide a yaw force in a predetermined direction transversely of the web, including means pivoting the guide means for movement about a pivot axis extending through the web guiding surface and being laterally spaced from a longitudinal axis of symmetry of the web and for swiveling the guide means about the pivot axis in a first mode of operation, and means operatively associated with the moving means for resisting the yaw force at a predetermined location.

From another aspect thereof, the subject invention resides in apparatus for precision guiding a magnetic recording web past recording head stacks and, more specifically, in the improvement comprising in combination a web edge guide, means for moving the web relative to the web edge guide, and said head stacks, means operatively associated with the web edge guide for urging the moving web against the web edge guide, including a porous round member having a taper in a direction away from the web edge guide and means connected to the round member for flowing a fluid through the porous round member for establishing on a surface of the round member a pressure gradient for supporting the moving web relative to the round member, means for mounting the round member at a distance from the web edge guide, and means for locating the web edge guide between the round member and the head stacks.

From another aspect thereof, the subject invention resides in apparatus for advancing a web and, more specifically, in the improvement comprising in combination cylindrical web guide means having an axis of rotation and a web guiding surface, and means coupled to the web guide means for pivoting the web guide means about an axis extending at an angle to the axis of rotation and extending through the web guiding surface, the pivoting means including means for spacing the pivot axis laterally from a longitudinal axis of symmetry of the web.

From yet another aspect thereof, the subject invention resides in apparatus for advancing a magnetic recording web past recording head stacks and, more specifically, in the improvement comprising in combination a web edge guide, means for moving the web relative to the web edge guide and the head stacks, means operatively associated with the web edge guide for urging the moving web against the web edge guide, including a round member having a taper in a direction away from the web edge guide and means for establishing on a surface of the round member a pressure gradient for supporting the moving web relative to the round member, means for mounting the round member at a distance from the web edge guide, and means for locating the web edge guide between the round member and the head stacks.

From yet another aspect thereof, the subject invention resides in a method of precision guiding a web and, more specifically, in the improvement comprising in combination the steps of providing a guide for the web having a web guiding surface, swiveling in a first mode of operation the guide about an axis extending through the web guiding surface and being laterally spaced from a longitudinal axis of symmetry of the web, moving the web over the swiveling guide in the first mode of operation, selectively arresting any swiveling of the guide in a second mode of operation, and moving the web over the arrested guide in the second mode of operation.

From yet another aspect thereof, the subject invention resides in an apparatus of precision guiding a web and, more specifically, in the improvement comprising in combination guide means for the web having a web guiding surface, means coupled to the guide means for swiveling in a first mode of operation the guide means about an axis extending through the web guiding surface and being laterally spaced from a longitudinal axis of symmetry of the web, means operatively associated with the guide means for moving the web over the swiveling guide means in the first mode of operation, means coupled to the guide means for selectively arresting any swiveling of the guide means in a second mode of operation of the apparatus, and means operatively associated with the guide means for moving the web over the arrested guide means in the second mode of operation of the apparatus.

From yet another aspect thereof, the subject invention resides in a method of precision guiding a magnetic recording web past recording head stacks and, more specifically, in the improvement comprising in combination the steps of moving the web, establishing a pressure gradient transversely of the web, twisting the moving web with the pressure gradient at a first location about an axis extending in a direction of movement of the web to provide a yaw force acting continuously in a predetermined direction transversely of the web, and resisting the yaw force at a predetermined second location located between and spaced from the first location and the recording head stacks.

BRIEF DESCRIPTION OF THE DRAWINGS

The subject invention and its objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
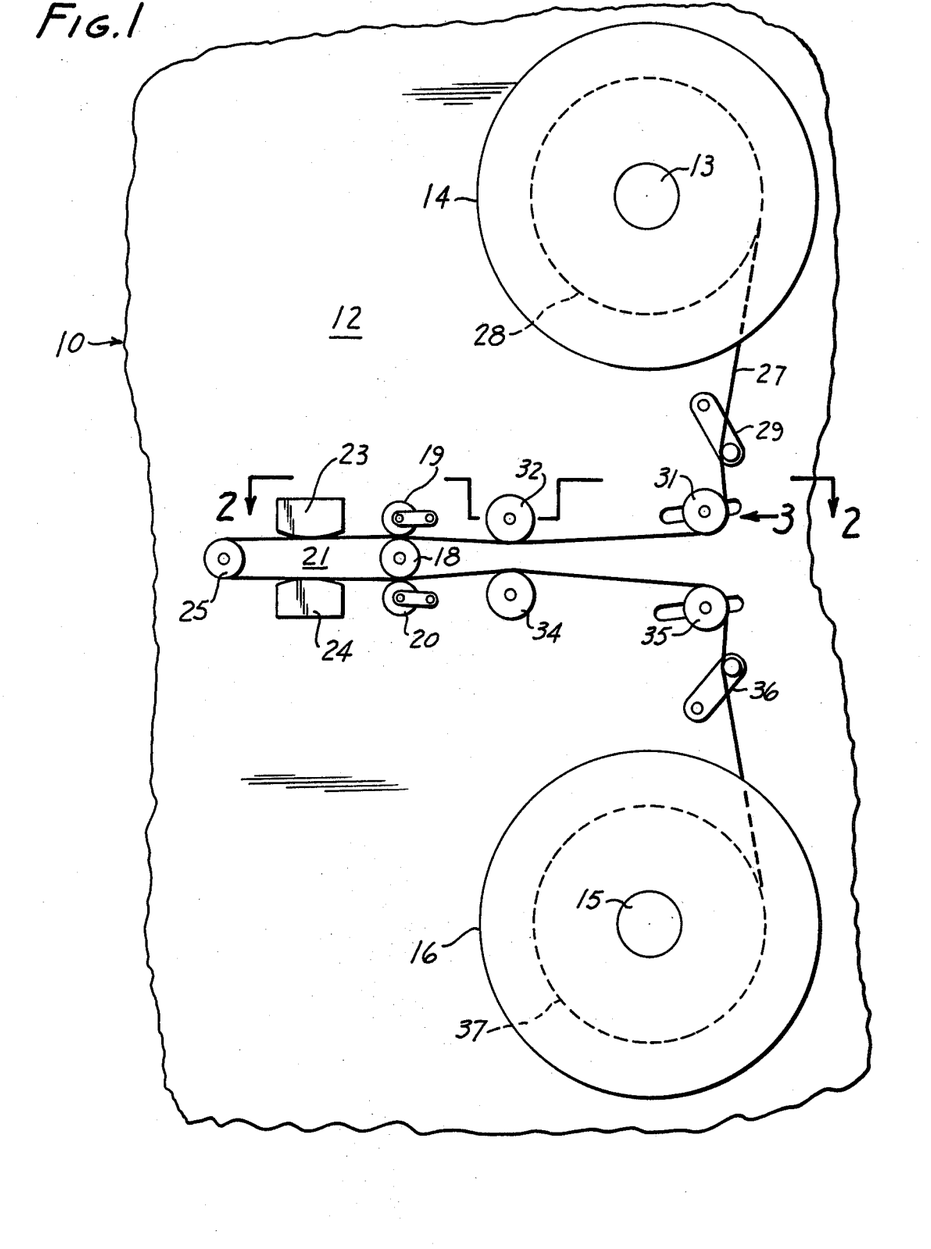
FIG. 1 is an elevation of a magnetic tape transport embodying the subject invention.
Figure 2:
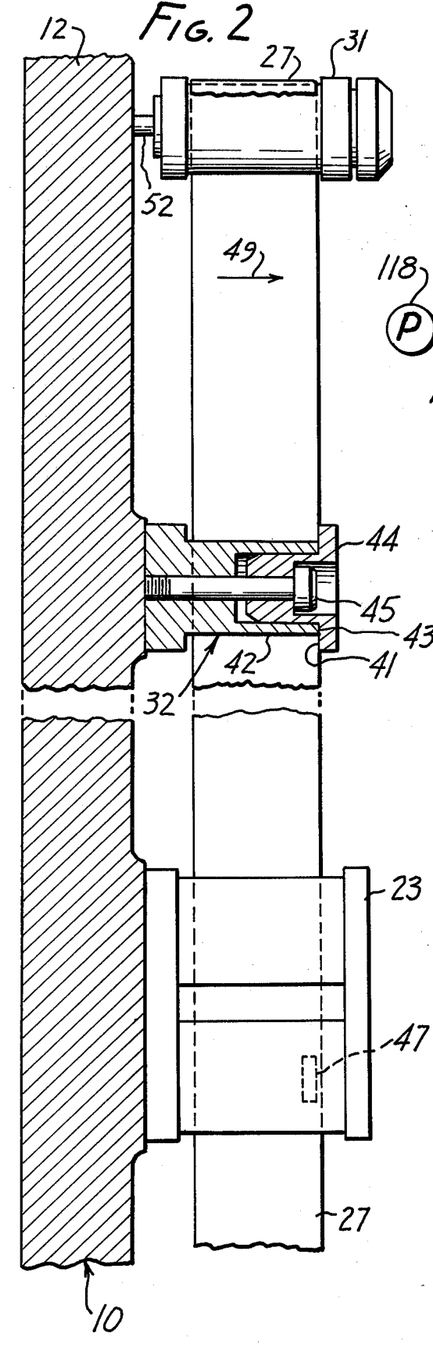
FIG. 2 is a view, on an enlarged scale, taken along the line 2 — 2 in FIG. 1.

Briefly, the magnetic tape transport 10 shown in FIGS. 1 and 2 has a baseplate or deck 12 rotatably supporting a reel hub assembly 13 for releasably retaining a tape supply reel 14, and a reel hub assembly 15 for releasably retaining a tape takeup reel 16.

The deck also rotatably supports a tape capstan 18 which cooperates with a pair of pinch rollers 19 and 20 in transporting tape through a closed loop 21 past record and reproduce head stacks 23 and 24 via a turnaround roller 25.

In the operation of the tape transport, magnetic recording tape 27 is advanced from a tape supply roll 28 on the reel 14 via a conventional tape break sensor to a tape twisting and yaw force imposing device 31 according to a preferred embodiment of the subject invention and thence to a tape edge guiding device 32 which precision guides the traveling tape 27 relative to the head stacks 23 and 24.

The tape capstan 18 may be driven by a conventional capstan drive with speed and servo loop control (not shown) in order to drive the tape through the closed loop 21 and to a further tape edge guiding device 34 and tape twisting and yaw force imposing device 35.

The tape advances from the device 35 via a conventional tape break sensor 36 to the takeup reel 16 to be wound into a tape roll 37 thereon.

Those skilled in the art of instrumentation tape recorders and similar equipment will recognize that the tape transport 10 will in practice be equipped with reel drives which may be of a conventional type in order to appropriately drive the reel 14 and 16 via the hub assemblies 13 and 15. Equipment of this type typically employs sensing rollers which in effect sense the lengths of the tape loops between the supply and takeup reels and the tape drive capstan in order to adjust tape tension by appropriate energization of the reel drive.

Figure 3:
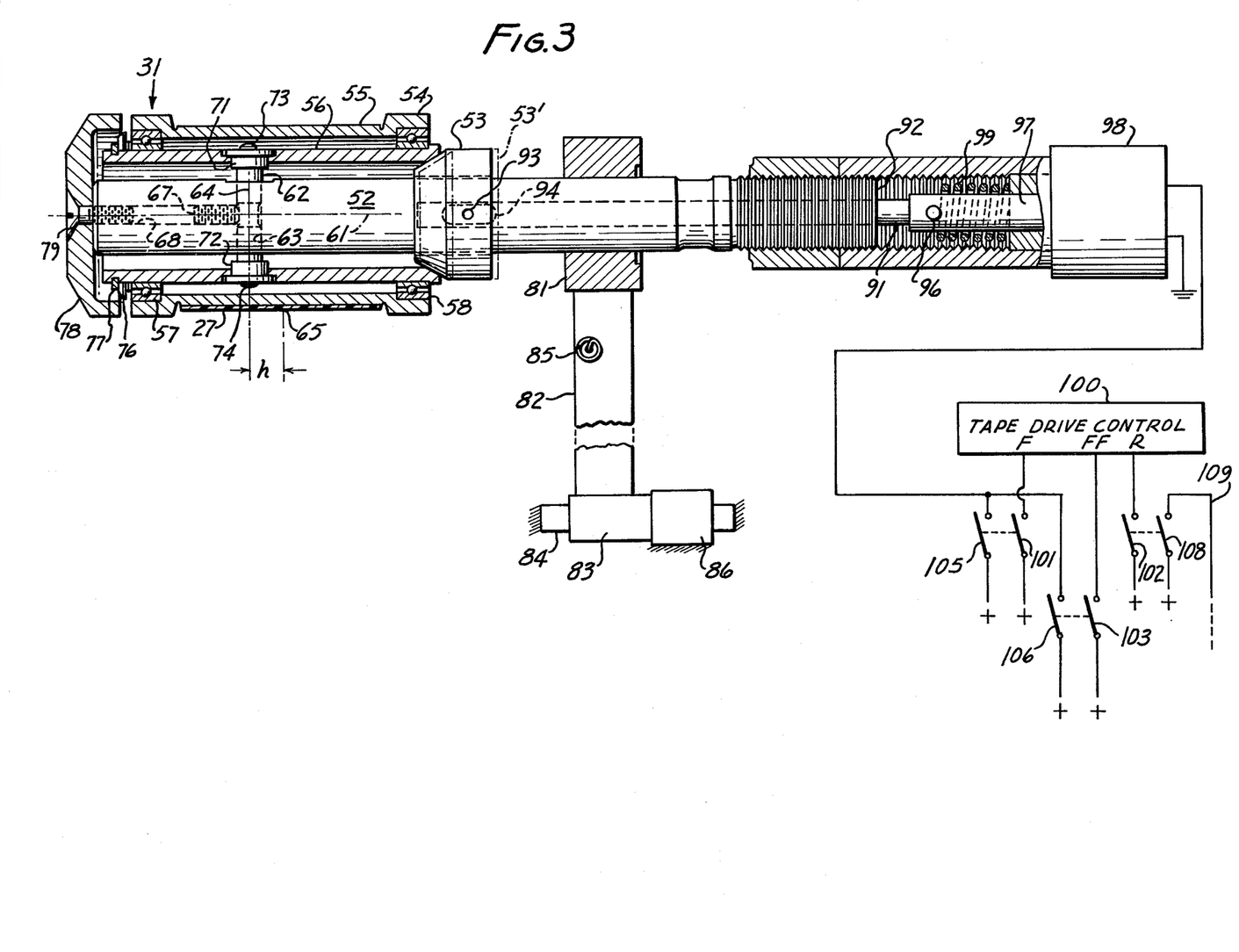
FIG. 3 is a view, on an enlarged scale, as seen approximately in the direction of the arrow 3 in FIG. 1, of a tape precision guiding device in accordance with a preferred embodiment of the subject invention.

In accordance with a preferred embodiment of the subject invention, the devices 31 and 35 may be employed as sensing rollers, as will become more readily apparent in conjunction with FIG. 3.

Apart from the latter possible function, each of the devices 31 and 35, at least during part of the operation of the tape transport 10, has the primary function of twisting the tape 27 and imposing a yaw force thereon whereby the tape is continuously applied to the precision guide surface 41 of the associated tape edge guiding device 32 or 34 located between the corresponding device 31 or 35 and head stack 23 or 24, as shown in FIG. 1. In FIG. 2, the tape edge guiding device 32 is shown in section in order to illustrate its composition. In particular, the device 32 has a socket 42 with a precision machined surface 43 which is engaged by the tape guide surface 41 of a plug 44 received in the socket 42 and releasably retained therein by a screw 45.

A chief object of this arrangement is to precision align the advancing tape 27, including the recording tracks located thereon, with the various heads of the packs 23 and 24. By way of example, one such head is indicated in dotted outline at 47 in FIG. 2. Since the tape drive capstan 18 and pinch roller assemblies 19 and 20 may be of a conventional type, they have not been shown in the aforeshortened view of FIG. 2.

The tape twisting and yaw force imposing device 31 in FIG. 2 has the general outline of the device illustrated in FIG. 3. However, it should be understood that the function of the device 31 is the same whether the preferred embodiment shown in FIG. 3, the preferred embodiment shown in FIG. 4, or any other embodiment of the subject invention and its basic principles is employed. Briefly, this function is to twist the moving tape 27 about an axis extending in a direction of movement of the tape to provide a yaw force acting continuously in a predetermined direction transversely of the tape, as indicated by an arrow 49 in FIG. 2. This basic function of the device 31 acts in combination with the chief function of the device 32 of resisting at its precision guiding surface 41 the yaw force 49 at a predetermined location which, in the illustrated preferred embodiments of the invention, is spaced from the tape twisting action device 31.

At this juncture, it should be understood that the expression "acting continuously in a predetermined direction" as used herein with respect to the yaw force does not necessarily means that this yaw force is always present in each of many possible modes of operation of the tape transport. Indeed, as more fully discussed in conjunction with FIG. 3, there are modes of operation during which the basic function of the twisting and yaw force imposing device 31 or 35 is deliberately arrested. However, the expression "acting continuously in a predetermined direction" is intended to signify that an imposed yaw force will always and consistently act in the same predetermined direction, rather than alternatively bilaterally as shown in the above mentioned Selsted, Cowles and Amos references. In this manner, the devices 31 and 35 will always urge the tape against the precision guiding surface 41 of the associated device 32 or 34.

In FIG. 2, the shaft 52 of the device 31 is shown mounted on the deck 12 in a general manner to emphasize the fact that the tape twisting and yaw force imposing function of the devices 31 and 35 is independent of any sensing roller or other function these devices may or may not have in a given application or in accordance with a preferred embodiment of the invention.

The device 31 and a special application thereof in accordance with a preferred embodiment of the invention will now be described with reference to FIG. 3.

To permit a general consideration of the device 31 shown in FIG. 3, it is assumed that a locking cone 53, to be described more fully below, is in an inactive position 53' indicated in dotted outline.

The device 31 in accordance with a preferred embodiment of the invention shown in FIG. 3 has a hollow-cylindrical tape guide roller 54 including a cylindrical surface 55 for receiving and guiding the traveling tape 27. A hollowcylindrical cage 56 is located inside the guide roller 54. A pair of ball bearings 57 and 58 between the cage 56 and the roller 54 mount the roller 54 for rotation about the cage 56 and also about the shaft 52 and its longitudinal axis 61.

A swivel or pivot pin 62 is received in a transverse bore 63 in the shaft and extends along an axis 64 which runs at an angle, such as a right angle in the illustrated preferred embodiment to the axis of rotation 61 and extends through the web guiding surface 55 as shown in FIG. 2.

In accordance with an important feature of the illustrated preferred embodiment of the invention, the axis 64 is laterally spaced from a longitudinal axis of symmetry 65 of the tape 27. In this manner, the tape 27 is twisted about an axis (64) being laterally spaced from the longitudinal axis of symmetry 65 of the tape 27, whereby the twisting of the moving tape is limited to one sense of rotation and the yaw force 49 (see FIG. 2) acts continuously in the predetermined direction transversely of the tape which will consistently apply the moving tape against the precision guide surface 41 of the edge guiding device 32.

The swivel pin 62 is releasably retained in the shaft bore 63 by a headless socket screw 67 located in a threaded longitudinal bore of the shaft 52.

The cage 56 is pivotally mounted on the transverse pin 62 by a pair of roller bearings 71 and 72 or equivalent bearing devices, attached to the pin by a pair of axial screws 73 and 74.

The cylindrical guide or roller 54 being rotatably mounted on the cage 56, it is actually that cylindrical guide or roller which is pivoted about the off-set axis 64 for the above mentioned twisting of the tape and development of the unidirectional yaw force 49.

Since the tape 27 in the tape transport 10 shown in FIG. 1, and in tape recording equipment in general, is under a longitudinal tension that may be designed as T per unit width, the off-set location of the pivot axis 64, designated by the letter h in FIG. 3, results in a torsional couple being developed about the axis 64 in the tape 27.

The fibre tension in the tape 27 is $$T \cdot dx \qquad (1)$$

wherein: T is the longitudinal tape tension per unit width, and x is the transverse linear coordinate of the tape, with $x = 0$ at the pivot axis 64.

The fibre tension evident according to (1) produces a torsional couple of $$x \cdot T \, dx \qquad (2)$$

The net couple developed in the cylindrical guide or roller 54 is $$\text{couple} = T \int_{x_2}^{x_1} X \, dx = T \cdot L \cdot h \qquad (3)$$

wherein: $x_1 = (L/2) - h$,
$x_2 = (L/2) + h$,
L is the width of the tape 27, and
h is the distance between the longitudinal axis of symmetry 65 of the tape and the off-set pivot axis 64.

At the edge guide 41, the lateral edge guiding force that applies the traveling tape 27 to the guiding surface is equal to $$T \cdot L \cdot h / B \qquad (4)$$

wherein: B is the distance along the tape 27 between the tape twisting and yaw force imposing device 31 and the tape edge guiding device 32.

In the illustrated preferred embodiment, the roller 54 and bearings 57 and 58 are retained on the cage 57 by a wave washer 76 and a retaining ring 77. The assembly is capped by a shaft cap 78 which is attached to the shaft 52 by a screw 79.

At this juncture, it will be recognized that the principles so far explained by reference to FIG. 3 are universally applicable in combination with tape edge guiding devices. FIG. 3 goes a step further in this respect by illustrating the utilization of the device 31 as a tape loop sensing roller. To this end, the shaft 52 is mounted in a collar 81 which, in turn, is attached to an arm 82. The arm, in turn, is attached to a collar 83 which pivots about an axis 84. A spring 85 biases the arm 82 so that the roller assembly 31 tensions the tape loop it engages. The collar 83, in turn, translates a rotary motion to a rotary position sensing device 86. The assembly including the parts 81 to 86 as such may be of a type conventionally used in the tape loop sensing and tape tensioning part of magnetic tape transports. In that case, the rotary position sensor 86 would control, for instance, the drive of the tape reel 14 in the sense of maintaining a desired tape tension.

A further feature in accordance with a preferred embodiment involves the above mentioned locking cone 53 which is actuable from its solidly illustrated rest position to an inactive position 53'. To this end, the shaft 52 is partially hollow and has a rod or link 91 extend longitudinally therethrough from a shaft end 92 to the region of the cone 53.

A coupling pin 93 extends through a slot 94 in the shaft 52 and connects the cone 53 to the link 91 for movement thereby between the rest and inactive positions.

The link, in turn, is coupled by a pin 96 to the plungers 97 of a solenoid 98. A spring 99 acts on the pin 96 to bias the cone 53 to its solidly illustrated rest position. As seen from the point of view of the function of the cone 53, this solidly illustrated rest position is the active position of the cone in that the cone 53, in the solidly illustrated rest position, engages the cage 56 and thereby arrests any swiveling of the cage relative to the axis 64.

On the other hand, energization of the solenoid 98 will move the plunger 97 toward the solenoid and thus overcome the bias of the spring 99. In this manner, the link 91 is also moved toward the solenoid, with the cone 53 being advanced to its inactive position 53'. In that inactive position, the cone is sufficiently spaced from the cage 56 so that the cage can swivel about the axis 64, whereby to twist the traveling tape 57 and generate the above mentioned unidirectional yaw force 49.

It should be understood at this juncture that the locking feature just described may be employed in combination with the device 31 without any other feature, or then with the sensing arm feature as shown in FIG. 3, or conceivable with any other desired feature.

In practice, the selective locking feature may advantageously be employed in combination with a tape drive control 100 which has forward (F) reverse (R), fast forward (FF) and other conventional tape advance features. For instance, normal tape transport forward operation may be initiated by closure of a switch 101. A reverse operation may be initiated by closure of a switch 102. Fast forward operation, on the other hand, may be initiated by closure of a switch 103.

As will be noted from FIG. 3, a first switch 105 for energizing the solenoid 98 is ganged with the normal forward switch 101. A second switch 106 for energizing the solenoid 98 is ganged with the fast forward switch 103.

In practice, this means that the locking cone 53 will be removed from the cage and the tape twisting and yaw force imposing device 31 will be activated to perform its tape guiding function in the forward advance and fast forward transportation modes of the tape 27. On the other hand, no energizing switch for the solenoid 98 is ganged with the reverse switch 102, so that the device 31 will be arrested or deactivated by the bias spring 99 and cone 53 in the reverse mode of operation of the tape transport. This obviates a serious problem in tape transports of the type shown in FIG. 1 wherein edge guiding devices are located at both sides of the closed loop 21.

In that case, if the type twisting and yaw force imposing function of the device 31 were permitted to remain active when the tape is transported reversely from the takeup reel to the supply reel 14, the tape tension and resulting force couple development would cause the tape to deflect, though very slightly, as a wide, thin beam so that the roller 54 would ride at a slight angle to its normal position. Thus, the tape centerline would approach the roller at an angle to the roller axis 61. A lateral component of tape velocity would thus be developed which, in time, would cause the tape to work over to and climb the rear guide edge of the roller 54.

The selective tape twisting arresting feature of the preferred embodiment of the subject invention and the corollary movement of the tape while the twisting feature is arrested, conveniently obviate the latter problem. By the same token, the device 35 is arrested in its tape twisting and yaw force imposing function when the tape 27 is transported at any slow, fast or other forward speed from the supply reel 14 to the takeup reel 16. On the other hand, if the tape is transported reversely, such as per closure of the reverse switch 102, a switch 108, ganged with a switch 102 is closed for energizing a solenoid (not shown) which is similar to the solenoid 98 by serves to activate the tape twisting and yaw force imposing function of the device 35 in response to closure of the switch 108 and energization of a line 109.

The device 35 may be, and typically is, identical to the device 31 shown in FIG. 3, except that its tape twisting and yaw force imposing function is arrested during any forward movement of the tape, but is activated during any reverse movement, as just explained.

Figure 4:
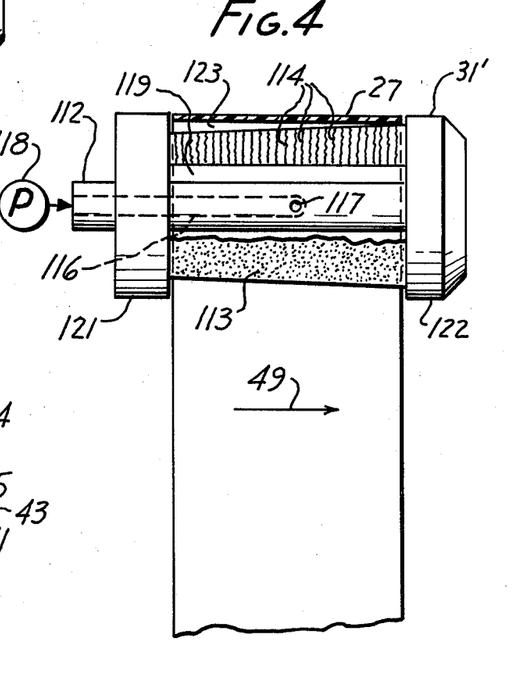
FIG. 4 is a view, similar to the view shown in FIG. 3, of a tape precision guiding device in accordance with a further preferred embodiment of the subject invention.

FIG. 4 illustrates a tape twisting and yaw force imposing device 31' in accordance with a further preferred embodiment of the subject invention. The device 31' of FIG. 4 may be employed in lieu of the device 31 and/or 35 in the tape transport of FIGS. 1 and 2.

The device 31' has a shaft 112 which may be mounted on the tape transport deck 12 or on a tape tension sensing arm of the type of arm 82 shown in FIG. 3.

The device 31' includes a round or frustoconical member 113 having a taper in a direction away from the tape edge guide 41. In other words, the taper of the member 113 proceeds in a direction opposite to the direction 49 of the yaw force imposed by the device 31' on the traveling tape 27 in order to urge that tape consistently against the tape edge guide 41 shown in FIG. 2.

The member 113 is porous so as to provide a multitude of air channels 114 throughout its thickness. The member 113 may be made of the same material as the well-known porous air bearings, or then of another porous material. The shaft 112 has a longitudinal bore 116 with at least one exit opening 117.

An air pump or other source of pressurized air 118 is connected to the bore 116 to supply air to a plenum chamber 119 inside the member 113. Pressurized air flows from the plenum chamber through the channels 114 to the surface of the porous member 113. The plenum chamber 119 is bilaterally closed by a pair of flanges 121 and 122 which are mounted on the shaft 112 and which, in turn, mount the conical member 113 therebetween.

As seen in FIG. 4, the porous material of the member 113 forms a wedge-shaped configuration and provides a channel 123 which is delimited by the traveling tape and the porous member 113 and which has an effective cross-section decreasing in the predetermined direction 49, or, in other words, increasing in the direction of the taper of the member 113.

Because of the tapered configuration of the member 113, air can more readily escape between the member 113 and the tape 27 at the flange 121 than at the other flange 122. In consequence, there is established across the surface of the member 113 a pressure gradient extending transversely of the tape 27 and effecting a twisting of the tape so as to produce the requisite yaw force continuously or unidirectionally in the direction of the arrow 49.

This will now be shown mathematically. To a very close approximation, the pressure exerted on the surface of the tape 27 by the air flow from the porous member 113 is a function of the plenum pressure and the air gap between the surface of the member 113 and the adjacent tape surface.

The gap in the channel 123 between the tape 27 and the member 113 can be defined as $$y = y_o + mx \quad (5)$$

wherein: $y$ is the gap or distance between the tape 27 and member 113, varying as a function of distance from the flange 122, $y_o$ is the initial gap between the tape 27 and member 113 adjacent the flange 122, $m$ is the taper angle of the member 113 in radians, and $x$ is the transverse linear coordinate along the tape 27 from the flange 122 to the flange 121.

Now if we consider the air flow transverse to the tape 27 along the channel 123 formed by the tape surface and the tapered member surface, we have the case of flow between plates of a separation $y$. The pressure drop, $dp$, and the volume of flow rate $v$, are related by $$v = -(y^3/12\mu)(dp/dx) \quad (6)$$

wherein: $\mu$ = viscosity.

With the air flow being dependent upon the plenum pressure, $P_o$, and the porosity, $K$, and the bulk of the air flow taking place through the porous walls of the member 113 and thence to the outside in the direction of the larger end of the channel 123 at the flange 121, we may write for a unit width of the channel 123 as the total volume passing the channel cross-section at $y$:

$$v_x = P_o K x \quad (7)$$

wherein: $v_x$ = volume flow rate per unit width. Using the expression for $y$ from equation (5), we obtain $$\frac{dp}{dx} \frac{(Y_o + mx)^3}{12\mu} = -P_o K x \quad (8)$$

which integrates to $$p = \frac{12\mu P_o K}{m^2} \left( \frac{1}{Y_o + mx} - \frac{Y_o}{2(Y_o + mx)^2} \right) \quad (9)$$

At any section of $x$ of width $dx$, the contribution of the pressure, $p$, to tape tension will be $$pR \, dx \quad (10)$$

wherein: R is the particular radius of the member 113.

The applied tension, T, will be balanced as follows:

$$T = \frac{12\mu R P_o K}{m^2} \int_0^L \left( \frac{1}{Y_o + mx} - \frac{Y_o}{2(Y_o + mx)^2} \right) dx = \quad (11)$$

-continued $$\frac{12\mu R P_o K}{m^3} \left( \log \frac{Y_o + mL}{Y_o} - \frac{Y_o}{2(Y_o + mL)} + \frac{1}{2} \right)$$

which establishes the value of $P_o$ to sustain the tape separation.

The pressure gradient will produce a torque about the vertical axis of the tape and will appear as a yaw force in the horizontal run of the tape. The magnitude of this couple will be $$\text{couple} = \quad (12)$$

$$\frac{12\mu R P_o K}{m^2} \int_0^L \left( \frac{1}{y + mx} - \frac{Y_o}{2(Y_o + my)^2} \right) \cdot x \cdot dx =$$

$$\frac{2\mu R P_o K Y_o}{m^4} \left( \frac{mL}{Y_o} + \frac{Y_o}{2(Y_o + mL)} - \frac{3}{2} \log \frac{Y_o + mL}{Y_o} - \frac{1}{2} \right)$$

wherein: L is the width of the tape 27. with $P_o$ determined from the expression for T.

With B being defined as under equation (4), the net force against the tape guide will be $$1/B \times \text{couple} \quad (13)$$

providing a guide force F, of $$F = \frac{Y_o T}{m \cdot B} \cdot \quad (14)$$

$$\frac{\frac{mL}{Y_o} \quad \frac{Y_o}{2(Y_o + mL)} - \frac{3}{2} \log \frac{Y_o + mL}{Y_o} - \frac{1}{2}}{\log \frac{Y_o + mL}{Y_o} - \frac{Y_o}{2(Y_o + mL)} + \frac{1}{2}}$$

An important feature of the subject guiding systems is that the guiding force is relatively independent of tape width and of tape lay on the reel.

The subject extensive disclosure will render apparent or suggest variations and modifications within the spirit and scope of the invention to those skilled in the art.

I claim:

1. A method of precision guiding a web, comprising in combination the steps of:
    moving said web;
    providing a guide for said moving web having a web guiding surface;
    pivoting said guide for movement about a pivot axis extending through said web guiding surface and being laterally spaced from a longitudinal axis of symmetry of said web for twisting said moving web about an axis extending in a direction of movement of said web to provide a yaw force acting continuously in a predetermined direction transversely of said web; and
    resisting said yaw force at a predetermined location.

2. A method as claimed in claim 1, wherein:
    said moving web is twisted by developing a torsional force couple about said axis, and applying said torsional force couple to said web.

3. A method as claimed in claim 1, wherein:
    said moving web is moved in said predetermined direction with said yaw force; and movement of said web in said predetermined direction is stopped at said predetermined location.

4. A method as claimed in claim 1, including the steps of:
swiveling said guide about said pivot axis in a first mode of operation during movement of said web;
selectively arresting said swiveling of said guide in a second mode of operation; and
moving the web while said swiveling is arrested.

5. A method as claimed in claim 1, wherein:
said twisting of the moving web is limited to one sense of rotation.

6. A method as claimed in claim 1, including the steps of:
providing a cylindrical guide for said web as said guide; and
pivoting said cylindrical guide for movement about said axis being laterally spaced from a longitudinal axis of symmetry of said web.

7. A method as claimed in claim 6, including the step of:
rotating said cylindrical guide about an axis of rotation.

8. A method as claimed in claim 1, including the steps of:
providing a cylindrical guide for said web as said guide;
rotating said cylindrical guide about an axis of rotation;
pivoting said cylindrical guide about an axis extending at an angle to said axis of rotation.

9. A method of precision guiding a magnetic recording web past recording head stacks, comprising in combination the steps of:
moving said web;
establishing a pressure gradient transversely of said web;
twisting said moving web with said pressure gradient at a first location about an axis extending in a direction of movement of said web to provide a yaw force acting continuously in a predetermined direction transversely of said web; and
resisting said yaw force at a predetermined second location located between and spaced from said first location and said recording head stacks.

10. A method as claimed in claim 9, including the steps of:
providing a fluid flow channel delimited by said moving web and having an effective cross-section decreasing in a predetermined direction to establish said pressure gradient; and
flowing a fluid through said channel to effect said twisting of the web.

11. A method as claimed in claim 10, wherein:
said fluid flow channel is also delimited by a porous material spaced from said web; and
said fluid is passed through said porous material to said channel.

12. A method as claimed in claim 11, wherein:
said porous material is provided with a wedgeshaped configuration.

13. A method as claimed in claim 11, wherein:
said porous material is frustoconically shaped.

14. In apparatus for precision guiding a web, the improvement comprising in combination:
means for moving said web;
guide means for said moving web having a web guiding surface;
means operatively associated with said moving means for twisting said moving web about an axis extending in a direction of movement of said web to provide a yaw force in a predetermined direction transversely of said web, including means pivoting said guide means for movement about a pivot axis extending through said web guiding surface and being laterally spaced from a longitudinal axis of symmetry of said web and for swiveling said guide means about said pivot axis in a first mode of operation; and
means operatively associated with said moving means for resisting said yaw force at a predetermined location.

15. An apparatus as claimed in claim 14, including:
means operatively associated with said twisting means for selectively arresting said swiveling of said guide means in a second mode of operation; and
means operatively associated with said moving means for moving said web while said swiveling is arrested.

16. An apparatus as claimed in claim 14, wherein:
said guide means include a cylindrical guide member and means for mounting said cylindrical guide member for rotation about an axis of rotation.

17. An apparatus as claimed in claim 14, wherein:
said guide means include a cylindrical guide member for said web, and means for mounting said cylindrical guide member for rotation about an axis of rotation, said pivoting means including means for pivoting said cylindrical guide member about an axis extending at an angle to said axis of rotation.

18. In apparatus for precision guiding a web, the improvement comprising in combination:
means for moving said web;
means operatively associated with said moving means for twisting said moving web about an axis extending in a direction of movement of said web to provide a yaw force in a predetermined direction transversely of said web; and
means operatively associated with said moving means for resisting said yaw force at a predetermined location;
said twisting means include a cylindrical guide member for said web, means for mounting said cylindrical guide member of rotation about an axis of rotation, and means for pivoting said cylindrical guide member about an axis extending at an angle to said axis of rotation and being laterally spaced from a longitudinal axis of symmetry of said web.

19. In apparatus for advancing a magnetic recording web past recording head stacks, the improvement comprising in combination:
a web edge guide;
means for moving said web relative to said web edge guide and said head stacks;
means operatively associated with said web edge guide for urging said moving web against said web edge guide, including a round member having a taper in a direction away from said web edge guide and means for establishing on a surface of said round member a pressure gradient for supporting said moving web relative to said round member;
means for mounting said round member at a distance from said web edge guide; and
means for locating said web edge guide between said round member and said head stacks.

20. An apparatus as claimed in claim 19, wherein:
said urging means include means for establishing a pressure gradient transversely of said web and said taper for effecting the twisting of the web with said pressure gradient.

21. An apparatus as claimed in claim 19, wherein:
said urging means include means for providing a fluid flow channel delimited by said moving web and said taper and having an effective cross-section increasing in said direction, and means connected to said channel providing means for flowing a fluid through said channel.

22. An apparatus as claimed in claim 21, wherein:
said round member is porous, and said fluid flowing means include means for passing a fluid through said porous round member.

23. An apparatus as claimed in claim 22, wherein:
said porous round member has a wedge-shaped configuration.

24. An apparatus as claimed in claim 22, wherein:
said porous round member has a frustoconical configuration.

25. In apparatus for precision guiding a magnetic recording web past recording head stacks, the improvement comprising in combination:
a web edge guide;
means for moving said web relative to said web edge guide and said head stacks;
means operatively associated with said web edge guide for urging said moving web against said web edge guide, including a porous round member having a taper in a direction away from said web edge guide and means connected to said round member for flowing a fluid through said porous round member for establishing on a surface of said round member a pressure gradient for supporting said moving web relative to said round member;
means for mounting said round member at a distance from said web edge guide; and
means for locating said web edge guide between said round member and said head stacks.

26. In apparatus for advancing a web, the improvement comprising in combination:
a hollow-cylindrical web guide roller;
a cage inside said hollow-cylindrical web guide roller;
means between said cage and said roller for mounting said roller for rotation about said cage; and
means connected to said cage for pivoting said cage for movement about an axis extending at an angle to an axis of rotation of said roller.

27. An apparatus as claimed in claim 26, wherein:
said pivoting means include means for pivoting said cage for movement about an axis being laterally spaced from a longitudinal axis of symmetry of said web.

28. An apparatus as claimed in claim 26, wherein:
said cage pivoting means include an elongate support member extending through said cage along an axis of rotation of said web guide roller, and means laterally projecting from said elongate support member for pivoting said cage for movement about an axis being laterally spaced from a longitudinal axis of symmetry of said web and extending at an angle to said axis of rotation.

29. An apparatus as claimed in claim 26, including:
a web edge guide spaced from said roller for limiting lateral movement of said web.

30. An apparatus as claimed in claim 26, wherein:
said web guide roller has a web guiding surface; and
said pivoting means include means for pivoting said cage for movement about an axis extending through said web guiding surface and laterally spaced from a longitudinal axis of symmetry of said web.

31. In apparatus for advancing a web, the improvement comprising in combination:
cylindrical web guide means having an axis of rotation and a web guiding surface; and
means coupled to said web guide means for pivoting said web guide means about an axis extending at an angle to said axis of rotation and extending through said web guiding surface, said pivoting means including means for spacing said pivot axis laterally from a longitudinal axis of symmetry of said web.

32. An apparatus as claimed in claim 31, including:
means for rotatably mounting said web guide means.

33. An apparatus as claimed in claim 31, wherein:
said web guide means are hollow-cylindrical; and
said pivoting means are located in said hollow-cylindrical web guiding means.

34. An apparatus as claimed in claim 31, including:
releasable means for selectively arresting said pivoting of the web guide means.

35. A method of precision guiding a web, comprising in combination the steps of:
providing a guide for said web having a web guiding surface;
swiveling in a first mode of operation said guide about an axis extending through said web guiding surface and being laterally spaced from a longitudinal axis of symmetry of said web;
moving said web over said swiveling guide in said first mode of operation;
selectively arresting any swiveling of said guide in a second mode of operation; and
moving said web over said arrested guide in said second mode of operation.

36. An apparatus of precision guiding a web, comprising in combination:
guide means for said web having a web guiding surface;
means coupled to said guide means for swiveling in a first mode of operation said guide means about an axis extending through said web guiding surface and being laterally spaced from a longitudinal axis of symmetry of said web;
means operatively associated with said guide means for moving said web over said swiveling guide means in said first mode of operation;
means coupled to said guide means for selectively arresting any swiveling of said guide means in a second mode of operation of said apparatus; and
means operatively associated with said guide means for moving said web over said arrested guide means in said second mode of operation of said apparatus.

37. An apparatus as claimed in claim 36, wherein:
said guide means include a cage and a hollow-cylindrical roller rotatably mounted on said cage and having said web guiding surface;
said swiveling means include means for swiveling in said first mode of operation said cage about an axis extending through said web guiding surface and being laterally spaced from said longitudinal axis of symmetry of said web; and
said arresting means include means for arresting any swiveling of said cage in said second mode of operation of said apparatus.

* * * * *